(12) United States Patent
Holland et al.

(10) Patent No.: US 10,739,517 B2
(45) Date of Patent: Aug. 11, 2020

(54) CLEAVING OPTICAL FIBERS

(71) Applicant: OFS Fitel, LLC, Norcross, GA (US)

(72) Inventors: William R Holland, Upper Black Eddy, PA (US); Robert Sienkowski, Trenton, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 16/364,579

(22) Filed: Mar. 26, 2019

(65) Prior Publication Data

US 2020/0096703 A1 Mar. 26, 2020

Related U.S. Application Data

(60) Provisional application No. 62/734,938, filed on Sep. 21, 2018.

(51) Int. Cl.
*G02B 6/25* (2006.01)
*G02B 6/36* (2006.01)
*G02B 6/42* (2006.01)

(52) U.S. Cl.
CPC ............. *G02B 6/25* (2013.01); *G02B 6/3636* (2013.01); *G02B 6/4243* (2013.01)

(58) Field of Classification Search
CPC ...... G02B 6/25; G02B 6/3636; G02B 6/3644; G02B 6/4243
USPC ........................................ 385/136, 137, 147
See application file for complete search history.

(56) References Cited

U.S. PATENT DOCUMENTS

| | | | | |
|---|---|---|---|---|
| 5,024,363 A | * | 6/1991 | Suda | G02B 6/25 225/2 |
| 5,029,791 A | * | 7/1991 | Ceccon | G02B 6/4226 248/287.1 |
| 5,123,581 A | * | 6/1992 | Curtis | G02B 6/25 225/104 |
| 5,881,198 A | * | 3/1999 | Haake | G02B 6/32 385/136 |
| 5,937,132 A | * | 8/1999 | Labeye | G02B 6/122 385/137 |
| 6,099,392 A | * | 8/2000 | Wiegand | B24B 19/226 225/2 |
| 6,634,079 B1 | * | 10/2003 | Kazama | G02B 6/25 29/564.4 |
| 7,669,744 B2 | * | 3/2010 | Yazaki | G02B 6/25 225/1 |
| 10,345,527 B2 | * | 7/2019 | Yamaguchi | G02B 6/24 |
| 2005/0100261 A1 | * | 5/2005 | Crafts | G02B 6/3616 385/11 |

(Continued)

*Primary Examiner* — Robert Tavlykaev
(74) *Attorney, Agent, or Firm* — Sam S. Han, Esq.

(57) ABSTRACT

Systems for holding optical fibers in a predefined orientation and cleaving the optical fibers are shown. In one embodiment, the system comprises a substrate structure with a groove along the top surface of the substrate. The groove extends from the substrate front edge in a direction that is parallel to the orientation of an optical fiber and is dimensioned to receive a portion of a bare optical fiber. The substrate structure also comprises a transverse structure on the top surface, which crosses the groove at an angle. The transverse structure receives ultraviolet light (UV) curable material, which secures the end of the bare optical fiber within the groove. Securing the bare optical fiber allows for proper tension to be applied during cleaving.

5 Claims, 2 Drawing Sheets

(56) References Cited

U.S. PATENT DOCUMENTS

2011/0079930 A1* 4/2011 Saito .................. G02B 6/3846
                                                264/1.25
2013/0075440 A1* 3/2013 Hasegawa ............ G02B 6/25
                                                225/96

* cited by examiner

CLEAVING OPTICAL FIBERS

CROSS REFERENCE TO RELATED APPLICATIONS

This application claims the benefit of U.S. provisional patent application Ser. No. 62/734,938, filed 2018-Sep.-21, having the title "UV Liquid Cleaver," by Holland, which is incorporated herein by reference in its entirety.

BACKGROUND

Field of the Disclosure

The present disclosure relates generally to optical fibers and, more particularly, to fiber-optic cleavers.

Description of Related Art

To achieve a good fusion splice between optical fibers, it is important to cleave the fibers properly. Because improving the cleaving process reduces labor costs and manufacturing times, in addition to increasing performance from reduced optical loss and increased reliability from lower heating levels, there are ongoing efforts to improve systems and processes for cleaving optical fibers.

SUMMARY

The present disclosure provides systems and methods for holding optical fibers in a predefined orientation and cleaving the optical fibers. In one embodiment, the system comprises a substrate structure with a groove along the top surface of the substrate. The groove extends from the substrate front edge in a direction that is parallel to the orientation of an optical fiber and is dimensioned to receive a portion of a bare optical fiber. The substrate structure also comprises a transverse structure on the top surface, which crosses the groove at an angle. The transverse structure and the groove receive ultraviolet light (UV) curable material, which secures the end of the bare optical fiber within the groove. Securing the bare optical fiber allows for proper tension to be applied during cleaving.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 3:
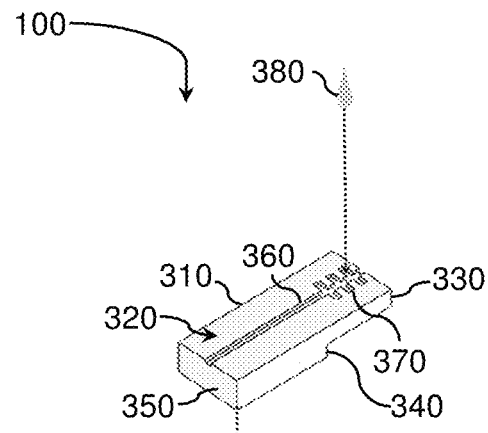
FIG. 3 is a diagram showing a perspective view of one embodiment of a substrate structure for securing a bare end of an optical fiber using an ultraviolet light (UV) curable material.

It is important to properly cleave an optical fiber to achieve good fusion splices. Large fiber diameters and cross-sectional shapes of the optical fibers sometimes produce uneven stresses in glass optical fibers, thereby resulting in sub-optimal crack propagation. These types of stresses arise from high tensions that are applied during clamping, which sometimes produce clamping forces in a direction that is not axially aligned to the longitudinal axis of the optical fiber. When an optical fiber has a glass cladding that is not round (e.g., star-shaped or octagonal-shaped cladding), there can also be torsional forces that are applied to the optical fiber as it re-orients its facets with the flat surface of the clamp. Sub-optimal cleaving manifests itself in higher costs of goods sold (COGS), larger scrap rates, and undesirable reworks to prevent lossy splices.

This disclosure seeks to ameliorate cleaving-related issues by providing systems and methods that use ultraviolet light (UV) curable material to hold an optical fiber in a predefined orientation and thereafter cleaving the optical fiber when it has been secured by the UV-curable material. In one embodiment, the system comprises a substrate structure with a groove along the top surface of the substrate. The groove extends from the substrate front edge in a direction that is parallel to the longitudinal axis of the optical fiber. The groove is dimensioned to receive a portion of a bare optical fiber in preparation for cleaving. The substrate structure also comprises a transverse structure on the top surface, which crosses the groove at an angle. The transverse structure allows for better securing of the UV-curable substance and, thus, reducing the likelihood of shear detachment or slippage. This, in turn, permits better securing of the bare optical fiber within the groove, thereby allowing for proper tension to be applied during cleaving. The use of a UV-curable substance reduces non-axial forces that are applied with mechanical clamps during cleaving, thereby improving the cleaving process and reducing manufacturing costs.

Having provided a broad technical solution to a technical problem, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Figure 2:
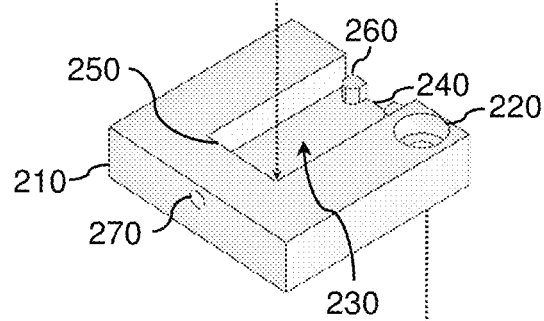
FIG. 2 is a diagram showing a perspective view of one embodiment of a sub-mount for use with the conventional component of FIG. 1.
Figure 1:
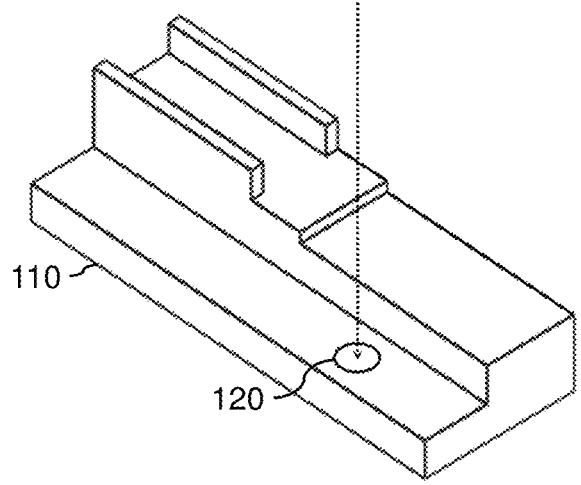
FIG. 1 is a diagram showing a perspective view of relevant internal components in a conventional fiber-optic cleaver.
Figure 4:
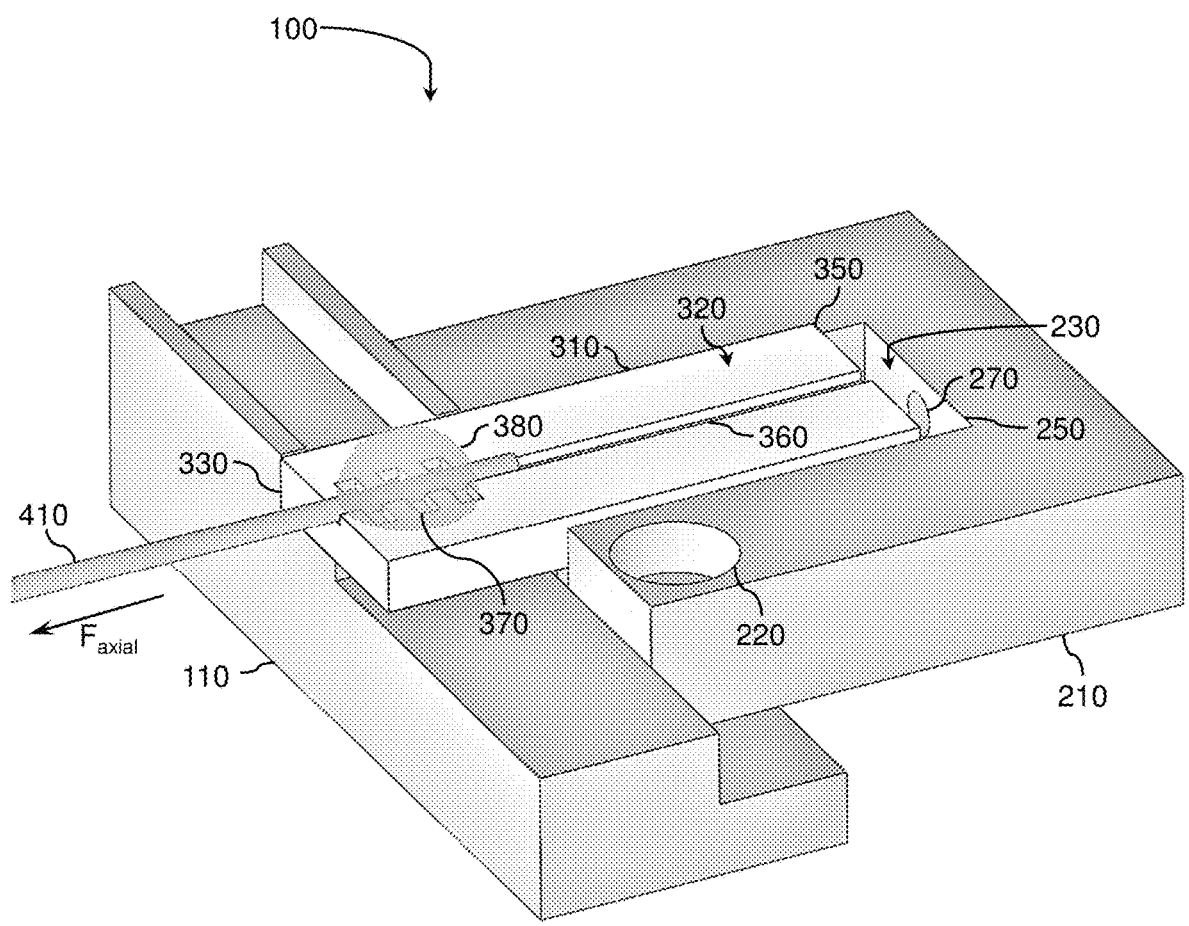
FIG. 4 is a diagram showing a perspective view of one embodiment of an assembled system for securing optical fibers for cleaving.

FIGS. 1, 2, and 3 show an exploded view of a system 100 for holding a bare portion of an optical fiber using a UV-curable material, while FIG. 4 shows an assembled view of the system 100. Consequently, FIGS. 1, 2, and 3 are discussed together to show the components of the system 100, while a description of FIG. 4 addresses several functions and advantages of the system 100.

With this in mind, attention is turned to FIGS. 1, 2, and 3. Generally, FIG. 1 shows an internal component of a conventional fiber-optic cleaver, while FIG. 2 shows one embodiment of a sub-mount for use with the component of FIG. 1, thereby permitting conventional fiber-optic cleavers to be retrofit with the embodiments disclosed herein. FIG. 3 shows one embodiment of a substrate structure for securing the bare end of an optical fiber using an ultraviolet light (UV) curable material.

More specifically, FIG. 1 shows a base structure 110 that can be found in several conventional optical fiber cleaving apparatuses. The base structure 110 comprises a base hole 120. The base hole 120 provides means for mounting another structure to the base structure 110.

FIG. 2 shows one embodiment of a sub-mount structure 210 for mounting to the base structure 110. Specifically, the sub-mount structure 210 is configured to mate with the base structure 110 as shown by the broken arrow connecting the sub-mount structure 210 to the base structure 110. The sub-mount structure 210 comprises a sub-mount hole 220 for aligning with the base hole 120. The sub-mount hole 220 provides means for aligning with the base hole 120. The sub-mount structure 210 further comprises a recess 230, which has a recess front edge 240 and a recess rear wall 250. The recess 230 is structurally configured and dimensioned as a receptacle for another structure to be held or secured therein. The sub-mount structure 210 also includes a sub-mount stop 260, which is located at the recess front edge 240. In the embodiment of FIG. 2, two (2) sub-mount stops 260 are shown, but those having skill in the art will appreciate that the number of sub-mount stops 260 can be increased to suit particular needs. The sub-mount structure 210 further comprises a plunger hole 270, which is located in the recess rear wall 250.

Next, as shown in FIG. 3, one embodiment of the system comprises a substrate structure 310, which has a substrate top surface 320, a substrate front edge 330, a substrate bottom structure 340, and a substrate rear 350. Notably, the substrate structure 310 comprises a groove 360, which extends along the substrate top surface 320. The groove 360 is dimensioned to receive a bare end of a to-be-cleaved optical fiber. As such, the groove 360 extends from the substrate front edge 330 in a direction that is parallel to the axial direction of the optical fiber when the fiber is oriented and held in place in for cleaving. For some embodiments, the substrate structure 310 further comprises a transverse structure 370 on the substrate top surface 320, which crosses the groove 360 at an angle (preferably at right angles to the groove 360). The transverse structure 370 is configured to receive ultra-violet (UV) light-curable material 380, which secures the portion of the bare optical fiber within the groove 360. The transverse structure 370 increases shear strength of the UV-curable material 380. In the embodiment of FIG. 3, three (3) transverse structures 370 are shown, but those having skill in the art appreciate that the number of transverse structures 370 can be increased to accommodate particular needs. Furthermore, it should be appreciated that the transverse structures 370 can be any type of texture applied to the top surface 320.

The substrate structure 310 is configured to nest within the recess 230 of the sub-mount 210. Specifically, in the embodiment of FIGS. 2 and 3, the substrate structure 310 is placed within the recess 230 of the sub-mount 210 with the substrate rear 350 in proximity to the sub-mount rear wall 250 and the substrate bottom structure 340 in proximity to the sub-mount stop 260. Thus, when a spring plunger is inserted into the plunger hole 270, the spring plunger applies a force against the substrate rear 350, which pushes the substrate structure 310 forward until the substrate bottom structure 340 abuts the sub-mount stop 260. Consequently, the spring plunger and the sub-mount stop 260 cooperatively secure the substrate structure 310 in the recess 230. To reduce clutter and increase clarity, a spring plunger is not shown in FIG. 1, 2, or 3. However, those having skill in the art understand both the structure and function of the spring plunger and, thus, further discussion of the spring plunger is omitted herein.

It should be appreciated that the embodiment of FIGS. 2 and 3 allow for a removable or disposable substrate structure 310, which avoids time-consuming cleaning of substrate structures for each cleave.

Turning now to FIG. 4, the embodiments of FIGS. 1, 2, and 3 are shown in one embodiment of an assembled system 100. As shown in FIG. 4, a bare portion 410 of an optical fiber is inserted into the groove 360. A UV-curable material 380 (e.g., UV-curable adhesive or other UV-curable liquid) is deposited onto the bare portion 410 of the optical fiber and thereafter cured. By way of example, for some embodiments, the UV-curable material 380 is deposited with a dropper or syringe. However, it should be appreciated that the process, when automated, permits use of other liquid-application systems that are known to those having skill in the art.

When deposited, the UV-curable material 380 wicks into the groove 360 and the transverse structure 370, thereby increasing the holding ability of the UV-curable material 380 under axial shear forces ($F_{axial}$). Additionally, because the bare end 410 of the optical fiber is oriented within the groove 360 while the UV-curable material 380 is in a liquid state, torsional forces (and other undesirable forces) are largely avoided as compared to traditional mechanical clamping systems. In other words, because the optical fiber is held rigidly in a near-stress-free state by the UV-curable material 380, the system 100 reduces much of the unwanted stresses that are associated with conventional mechanical clamping. Consequently, when an axial force ($F_{axial}$) is applied to the fiber during cleave, the optical fiber experiences little-to-no other forces that can compromise the integrity of crack propagation in the glass fiber along the cleaving direction.

Also, those having skill in the art understand that the sub-mount structure 210 and the substrate structure 310 are adjustable in both an axial direction (with reference to the longitudinal direction of the optical fiber) and a transverse direction (with reference to the radial direction of the optical fiber). For example, adjustment screws can be used to fine tune the height of the sub-mount structure 210 with reference to the base structure 110. Similarly, either the sub-mount hole 220 or the base hole 120 can be slotted to permit minor transverse adjustments.

Lastly, because the sub-mount structure 210 permits retrofit to conventional optical fiber cleavers, the process of applying and curing the UV-curable material 380 can be automated by re-programming the software of the fiber-optic cleaver.

Embodiments of the system 100 of FIGS. 1, 2, 3, and 4 allow for successful cleaving of small fibers (125 micrometer (μm) diameter fibers) as well as larger-diameter fibers (250 μm and 400 μm diameter fibers). Additionally, the embodiments of the system 100 permit successful cleaving of fibers with irregular-shaped cladding (e.g., star-shaped fibers). Furthermore, the system 100 permits tensions that exceed 900 grams (g) and the texture provided by the transverse structures 370 withstands up to 2,000 g of tension, suitable for 480 μm-diameter optical fibers.

Although others have proposed low-temperature melting metal alloys (e.g., soldering the bare portion of the optical fiber), those approaches require heating and melting of the alloy in a suitable container and controlling other processes associated with heating and cooling the alloy to their respective temperatures as needed. By using a UV-curable material 380, inconveniences and complexities that are associated with melting metals are avoided.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A system for holding optical fibers in a predefined orientation and cleaving the optical fibers, the system comprising:
   (a) a base structure of a conventional optical fiber cleaving apparatus, the base structure comprising a base hole;
   (b) a sub-mount structure for mounting to the base structure, the sub-mount structure comprising:
      (b1) a sub-mount hole for aligning with the base hole;
      (b2) a recess comprising:
         (b2A) a recess front edge; and
         (b2B) a recess rear wall;
      (b3) a sub-mount stop located at the recess front edge; and
      (b4) a plunger hole located in the recess rear wall;
   (c) a disposable substrate structure comprising:
      (c1) a substrate top surface;
      (c2) a substrate front edge;
      (c3) a substrate bottom structure for abutting against the sub-mount stop;
      (c4) a substrate rear;
      (c5) a groove extending along the substrate top surface, the groove extending from the substrate front edge in a direction parallel to the predefined orientation, the groove being dimensioned to receive a portion of a bare optical fiber for cleaving, the groove further being dimensioned to permit wicking of ultraviolet (UV) light-curable material between the portion of the bare optical fiber and the groove; and
      (c6) a transverse structure on the substrate top surface, the transverse structure crossing the groove at an angle, the transverse structure being dimensioned to permit wicking of the UV-light-curable material, the UV-light-curable material for securing the portion of the bare optical fiber within the groove; and
   (d) a spring plunger insertable into the plunger hole, the spring plunger for applying a force against the substrate rear, the spring plunger and the sub-mount stop cooperatively securing the substrate structure in the recess.

2. A system for holding optical fibers in a predefined orientation and cleaving the optical fibers, the system comprising:
   a disposable substrate structure comprising:
      a substrate top surface; and
      a substrate front edge;
   a groove along the substrate top surface, the groove extending from the substrate front edge in a direction parallel to the predefined orientation, the groove being dimensioned to receive a portion of a bare optical fiber for cleaving, the groove further being dimensioned to permit wicking of ultraviolet (UV) light-curable material between the portion of the bare optical fiber and the groove; and
   a transverse structure on the substrate top surface, the transverse structure crossing the groove at an angle, the transverse structure being dimensioned to permit wicking of the UV-light-curable material, the UV-curable material for securing the portion of the bare optical fiber within the groove.

3. The system of claim 2, further comprising:
   a sub-mount structure comprising:
      a recess for holding the disposable substrate structure therein, the recess comprising:
         a recess front edge; and
         a recess rear wall;
      a sub-mount stop located at the recess front edge; and
      a plunger hole located in the recess rear wall;
   a substrate rear;
   a substrate bottom structure for abutting against the sub-mount stop; and
   a spring plunger insertable into the plunger hole, the spring plunger for applying a force against the substrate rear wall, the spring plunger and the sub-mount stop cooperatively securing the disposable substrate structure in the recess.

4. The system of claim 3, further comprising a base structure of a conventional optical fiber cleaving apparatus, the base structure comprising a base hole for aligning with the sub-mount hole.

5. A system for holding optical fibers in a predefined orientation and cleaving the optical fibers, the system comprising:
   a base structure of a conventional optical fiber cleaving apparatus, the base structure comprising a base hole;
   means for mounting to the base structure;
   means for aligning with the base hole;
   disposable means for receiving a portion of a bare optical fiber;
   wicking means for receiving liquid ultra-violet (UV) light-curable material; and
   means for securing the disposable means.

* * * * *